US007004533B2

(12) United States Patent
Arthur et al.

(10) Patent No.: US 7,004,533 B2
(45) Date of Patent: Feb. 28, 2006

(54) COMPOSITE FLOOR FOR UTILITY VEHICLE

(75) Inventors: John Raymond Arthur, Grovetown, GA (US); Daniel James Knight, Lexington, KY (US); Michael David, Martinez, GA (US); Russell William Strong, Craftsbury Common, VT (US); Mohamad El-Zein, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/945,540

(22) Filed: Aug. 29, 2001

(65) Prior Publication Data

US 2003/0042761 A1 Mar. 6, 2003

(51) Int. Cl.
*B62D 33/077* (2006.01)

(52) U.S. Cl. ............ 296/190.08; 296/198; 296/193.07; 296/901.01

(58) Field of Classification Search ................ 296/198, 296/190.08, 204, 901, 193.07, 901.01; 180/89.2, 180/89.12
See application file for complete search history.

(56) References Cited

U.S. PATENT DOCUMENTS

| | | | | |
|---|---|---|---|---|
| 3,339,967 A | | 9/1967 | Harris | |
| 4,453,763 A | * | 6/1984 | Richards | 296/901 X |
| 4,600,236 A | | 7/1986 | Weiss et al. | |
| 4,917,435 A | * | 4/1990 | Bonnett et al. | 296/190.08 |
| 5,238,267 A | | 8/1993 | Hutchison et al. | |
| 5,273,340 A | * | 12/1993 | Nelson et al. | 296/190.08 |
| 5,558,368 A | | 9/1996 | Cerny et al. | |
| 5,975,625 A | * | 11/1999 | Simplicean | 296/901 X |
| 6,073,991 A | * | 6/2000 | Naert | 296/193.07 |

FOREIGN PATENT DOCUMENTS

| | | | | |
|---|---|---|---|---|
| DE | 2128318 | * | 12/1972 | 296/901 |
| DE | 2832863 | * | 2/1980 | 296/190.08 |
| FR | 1443809 | | 6/1966 | |
| GB | 2118909 | * | 11/1983 | 296/190.08 |
| JP | 0211174 | * | 9/1986 | 296/198 |

OTHER PUBLICATIONS

Brochure: "John Deere 5000 TEN Series Tractors 45 to 65 PTO - Horsepower," 20 pgs.

* cited by examiner

*Primary Examiner*—Dennis H. Pedder
(74) *Attorney, Agent, or Firm*—The Law Office of Randall T. Erickson, P.C.

(57) ABSTRACT

For a compact tractor, a composite molded plastic floor and fender structure is supported on a chassis of the vehicle. The floor and fender structure includes a foot supporting region, a seat supporting region and two fenders all formed of a composite RIM plastic material. The unitary floor and fender structure simplifies manufacture of the tractor as well as providing a lightweight, durable structure.

39 Claims, 7 Drawing Sheets

COMPOSITE FLOOR FOR UTILITY VEHICLE

TECHNICAL FIELD OF THE INVENTION

The invention relates to structures for utility vehicles, particularly to floor and fender parts for utility vehicles.

BACKGROUND OF THE INVENTION

Utility vehicles such as compact tractors include a frame or chassis supported on wheels, the chassis supporting an operator area or cab. The operator area includes a floor panel and fender panels, typically made from stamped steel sheets and welded together. The floor panels support a seat. The fender panels partially surround or enclose the large rear wheels of the tractor, protecting the operator from debris flung from the rotating wheels.

Such floor and fender structures are disclosed, for example, in U.S. Pat. No. 4,600,236.

The present inventors have recognized the desirability of decreasing the cost of manufacturing utility vehicles. Particularly, the present inventors have recognized the advantage of reducing the manufacturing steps and time required to form a floor and fender structure of separate pieces.

SUMMARY OF THE INVENTION

The present invention provides an integral floor and fender structure for a utility vehicle composed of a composite plastic material. The invention provides a floor and fender structure that also integrates frame mounting means, control wiring and cabling chases, battery, controls, and seat mounting surfaces or brackets, and door and window sealing surfaces.

The invention provides a composite integral floor and fender structure that includes a seat supporting surface, control mounting surfaces, a foot supporting surface, spaced apart fender covering surfaces, side rails for door/window sealing and a frame mounting means. The side rails are located adjacent to the door opening to increase the strength of the floor structure at the doorways for stepping on and stepping off the vehicle. The side rails also increase the overall rigidity of the floor and fender structure as well as provide a sealing surface for the doors.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
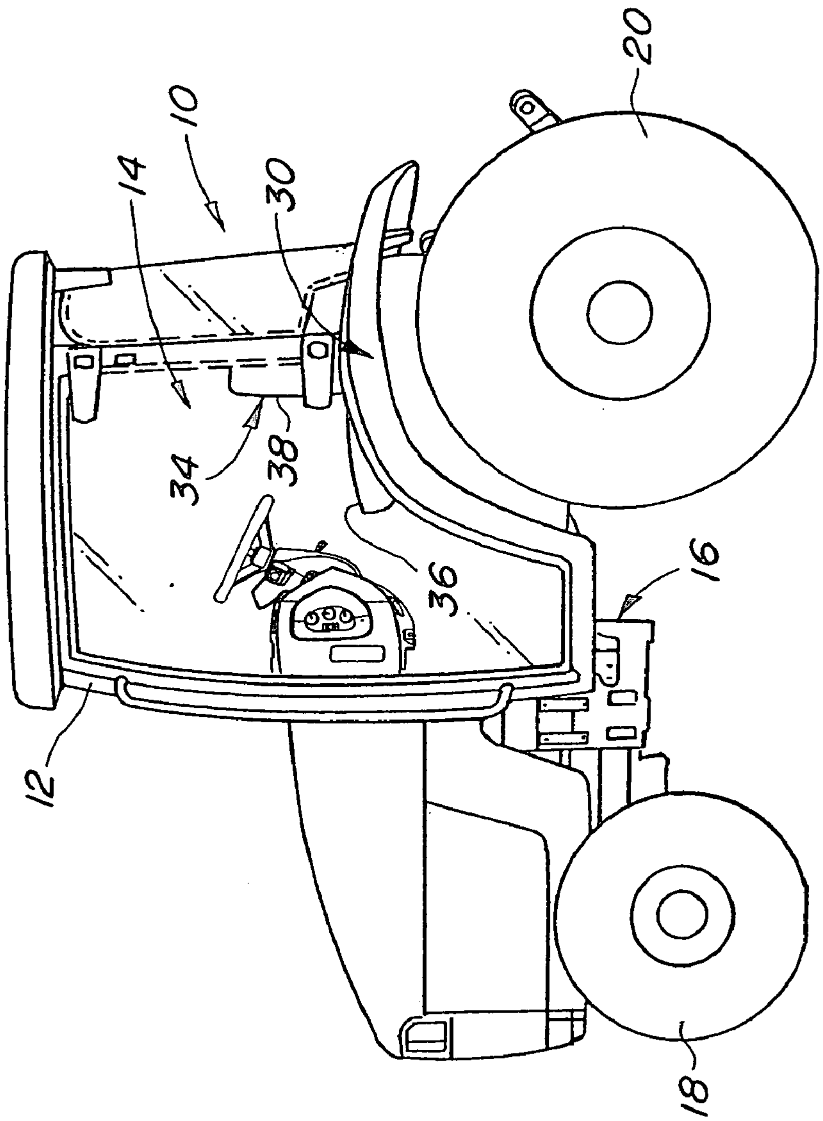
FIG. 1 is an elevational view of a compact tractor incorporating a floor and fender structure of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a utility vehicle 10, such as a compact tractor, incorporating the present invention. The utility vehicle 10 includes a steel frame 12 as part of an operator area or cab 14 supported on a chassis 16 which is supported on front wheels 18 and larger rear wheels 20. A floor and fender structure 30, is supported on the chassis 16. The floor and fender structure 30 supports an operator's seat 34 including a seat portion 36 and a back portion 38.

Figure 2:
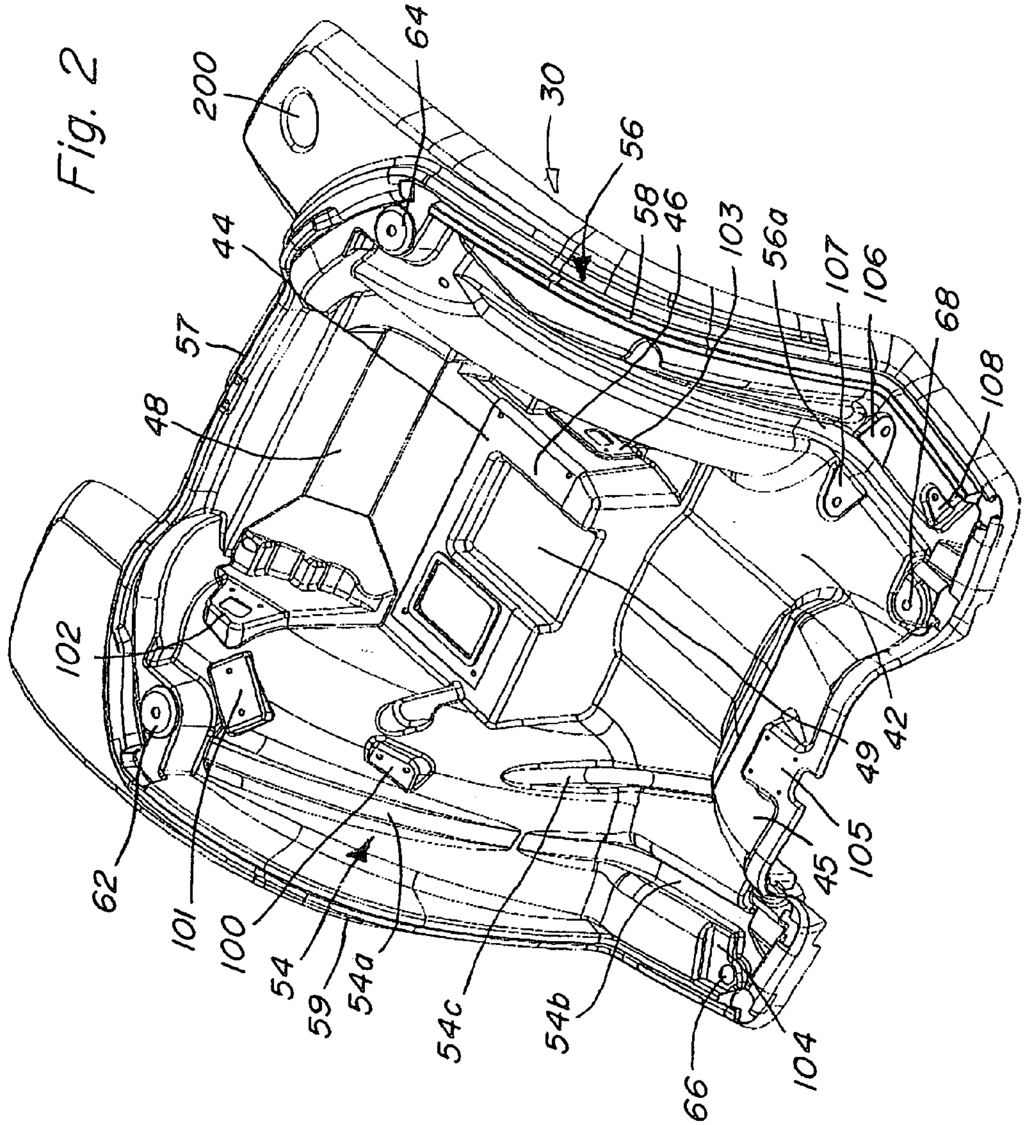
FIG. 2 is a perspective view of the floor and fender structure utilized in the utility vehicle of FIG. 1.
Figure 3:
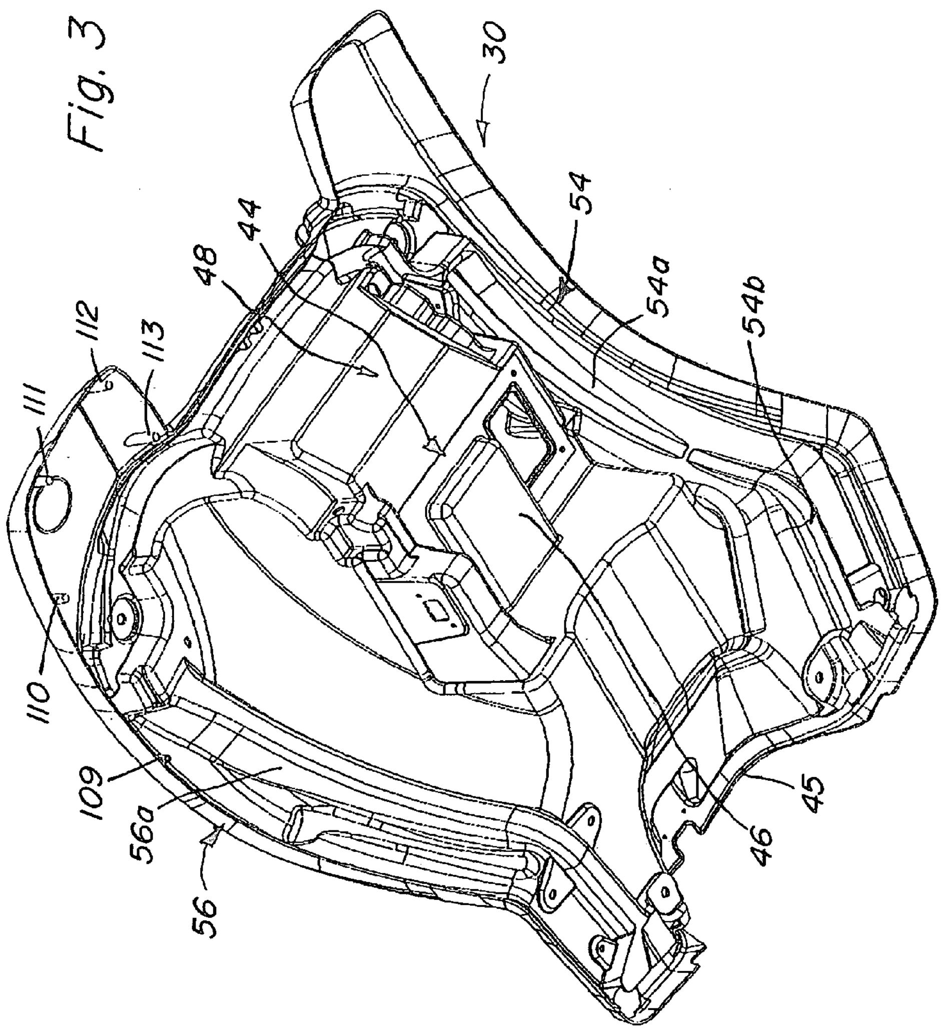
FIG. 3 is a perspective bottom view of the floor and fender structure shown in FIG. 2.

FIGS. 2–3 illustrate the floor and fender structure 30. The structure 30 is formed by a contoured body. The floor and fender structure 30 includes a foot supporting area 42, a seat supporting region 44, including a seat support 46 and rear wall 48. The structure 30 further includes a first fender 54 and a second fender 56. The first fender 54 includes a raised rail **54*a* and a recessed rail 54*b*, substantially in line, to accommodate the steel frame 12. The recessed rail 54*b* extends across the foot supporting area 42. The first fender 54 further includes an oblique recessed rail 54*c* which extends from the fender down into the foot supporting area 42. The recessed rail 54*c*** provides a chase for electrical wires and mechanical cables for controls.

The second fender 56 includes a recessed rail **56*a* which extends down the fender and across the foot supporting area 42 to accommodate the steel frame 12. At a front of the foot supporting area 42 is a humped area or "tunnel" 45 for providing clearance for the drive train beneath the floor and fender structure 30**.

The structure 30 includes a back rail 57 that provides a window sealing surface (FIG. 2). The structure 30 includes side rails 58, 59 (FIG. 2) adjacent to the door or window opening that increases the overall rigidity of the floor and fender structure 30 as well as providing door or window sealing surfaces.

The structure 30 includes mounting surfaces and features 100–113 to allow mounting of controls, a battery, a fuel tank, a step and a steering column. Mounts 100–103 are for the controls, mount 104 is for the battery, mounts 106–108 are for the step, mounts 109–113 are for the fuel tank, and mount 105 is for the steering column. Hole 200 allows the fuel tank filler neck to penetrate the structure 30. Feature 49 is for operator's manual and tool storage.

Figure 4:
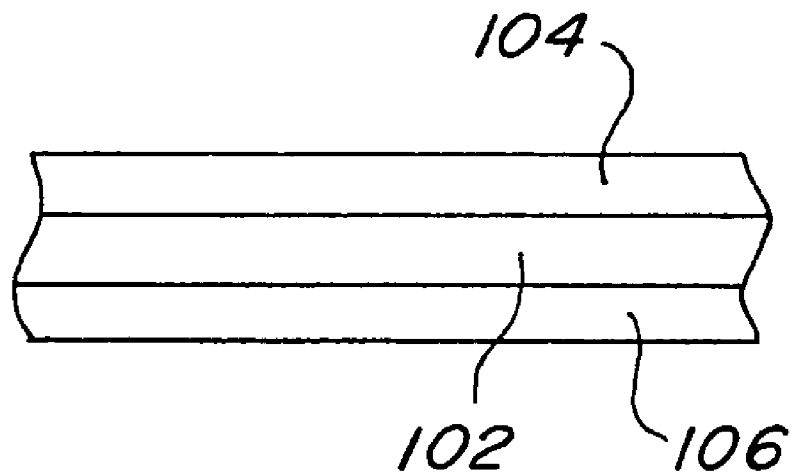
FIG. 4 is a sectional view of one laminate arrangement of the floor and fender structure of the invention.

FIG. 4 illustrates a cross-section of a composite used for the structure 30. A layer of fiberglass 202 is sandwiched by a top first layer of RIM material 204 and a bottom second layer of RIM material 206. The composite gives the structure 30 exemplary rigidity and strength while retaining a lightweight character.

Alternatively, the structure 30 can be composed of a generally homogeneous thickness of fiberglass reinforced RIM plastic.

The plastic materials of either structure can be reinforced with fiberglass and/or structural foam to add rigidity.

Figure 5:
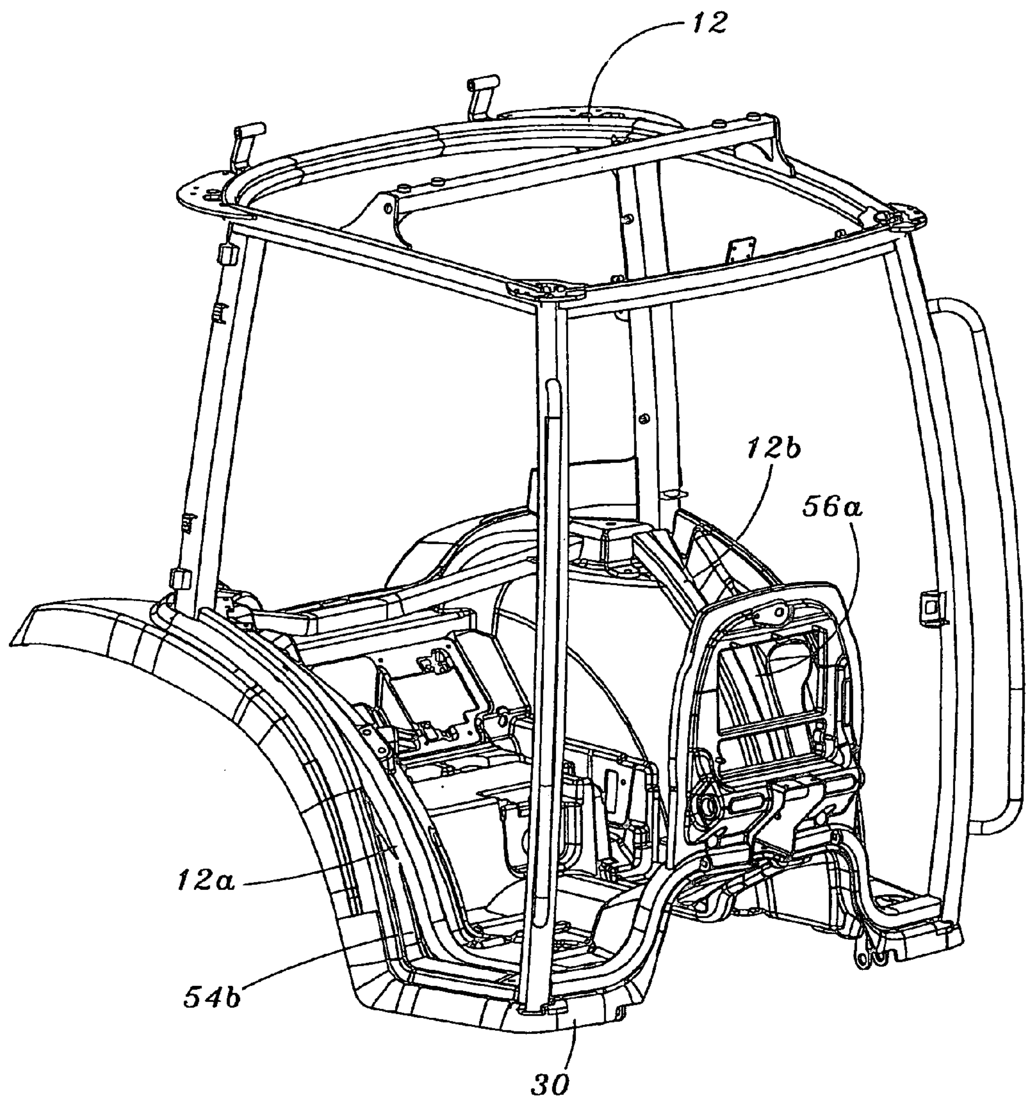
FIG. 5 is a perspective view of the floor and fender structure and a steel frame applied onto the floor and fender structure.
Figure 6:
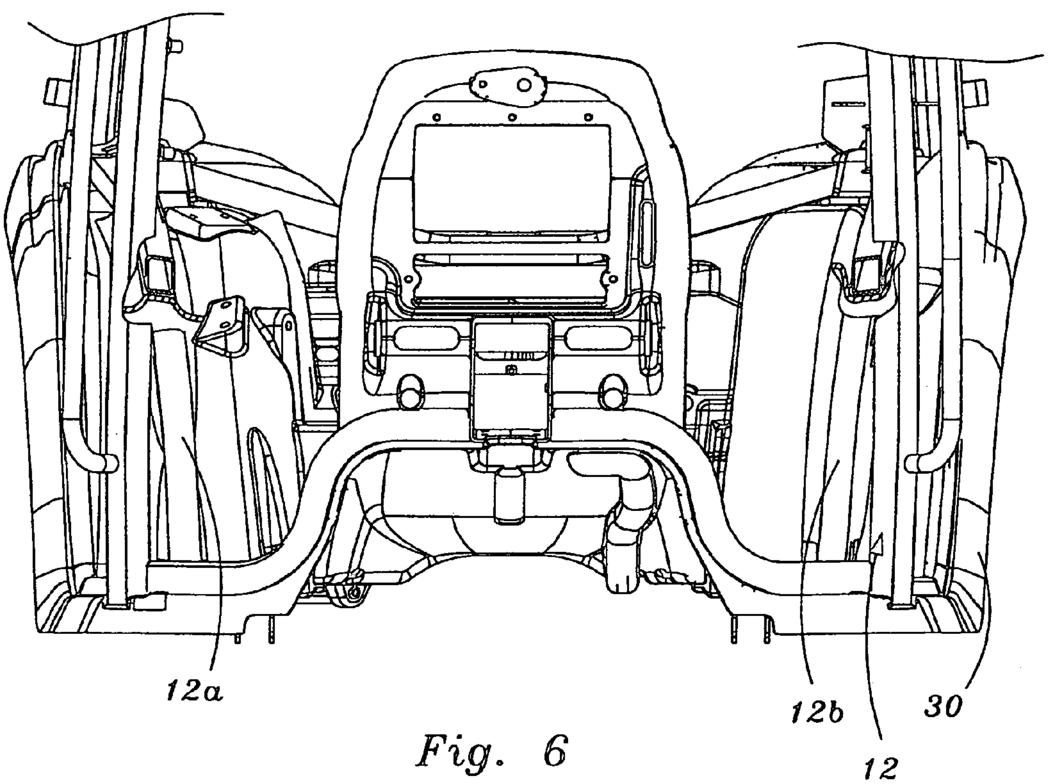
FIG. 6 is a front view of the floor and fender structure and frame of FIG. 5 showing a rear section.
Figure 7:
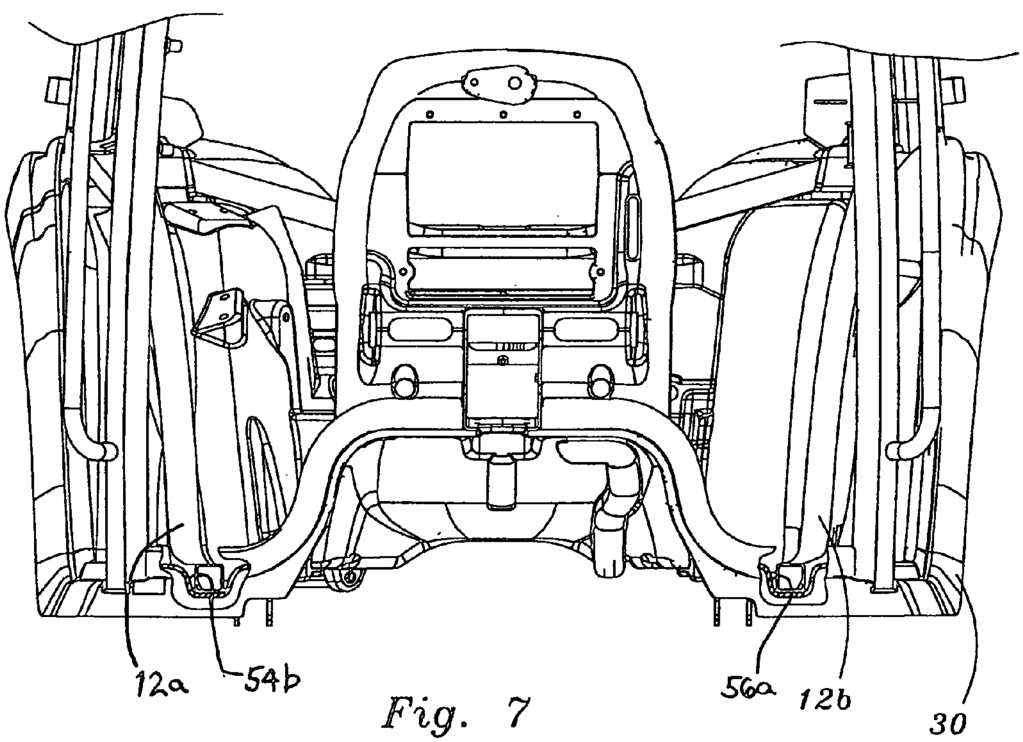
FIG. 7 is a front view of the floor and fender structure and frame of FIG. 5 showing a front section.

FIGS. 5 through 7 illustrate the frame 12 mounted on the floor and fender structure 30. Side members **12*a* and 12*b* fit within the side recessed rails 54***b*, 56*a*. The frame 12 can be attached to the structure 30 by fasteners or other means. The side members 12*a*, 12*b* can also be adhesively secured into the recessed rails.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a tractor having a chassis supported on wheels, and an operator's cab framed by a metal cab frame, the improvement comprising:

an integral floor and fender structure formed by a contoured body substantially composed of plastic material, said contoured body configured to be supported on said chassis, said contoured body having fender regions; and said metal cab frame substantially composed of steel and supported on a top side of said contoured body, said metal cab frame comprising side members supported on said plastic material of said contoured body, and fixed to said contoured body, said metal cab frame extending upward from said top side of said contoured body, said contoured body comprising a pair of concave recesses, each recess of said pair of recesses located within one fender region, each said side member arranged at least partially within one said recess.

2. The improvement according to claim 1, wherein said contoured body comprises a fiberglass layer.

3. The improvement according to claim 2, wherein said contoured body comprises a fiberglass layer laminated between a top RIM layer and a bottom RIM layer.

4. The improvement according to claim 1, wherein said contoured body includes right and left fenders and a seat supporting platform integrally formed between said right and left fenders.

5. The improvement according to claim 1, wherein said contoured body comprises a foot supporting area and formed rail portions extending along said fenders and into said foot supporting area.

6. The improvement according to claim 1, wherein said contoured body includes reinforced portions for interface with isolation mounts.

7. The improvement according to claim 1, wherein said contoured body includes a foot supporting area, seat and seatback supporting areas, fender covering area, and a rear wall.

8. The improvement according to claim 1, wherein said contoured body comprises a center layer covered on opposite surfaces by RIM material, wherein said RIM material comprises a composite plastic material.

9. The improvement according to claim 8, wherein said center layer comprises fiberglass.

10. The improvement according to claim 1, wherein said contoured body comprises a center layer covered on opposite surfaces by RIM material.

11. The improvement according to claim 1, wherein said contoured body comprises a laminated structure.

12. The improvement according to claim 1, wherein said contoured body is composed of a substantially homogeneous fiber-reinforced plastic.

13. The improvement according to claim 1, wherein said contoured body comprises integral features for mounting said metal cab frame.

14. The improvement according to claim 1, wherein said floor and fender structure comprises integral features for mounting controls, a steering column, a battery, a fuel tank, and a step.

15. The improvement according to claim 1, wherein said contoured body comprises integral features for storage of an operator's manual and tools.

16. The improvement according to claim 1, wherein said contoured body comprises integral features for forming window and door sealing surfaces.

17. The improvement according to claim 1, wherein said contoured body comprises at least one side rail that forms a door sealing surface.

18. In a utility vehicle having a chassis supported on wheels, and an operator's cab at least partly supported by a metal cab frame, the improvement comprising:

an integral floor and fender structure formed by a contoured body substantially composed of plastic material, said contoured body including recessed rails;

said metal cab frame supported on a top side of said contoured body; and wherein said operator's cab comprises a roof and said metal cab frame comprises front and rear columns supporting said roof, and side members connecting said front columns to said rear columns, said side members being secured to a top surface of said contoured body within said recessed rails, each recess rail having an open top, a bottom and opposite sidewalls.

19. The improvement according to claim 18, wherein said side members of said metal cab frame are longitudinally extending on lateral sides of said metal cab frame and are adhesively secured into said recessed rails.

20. The improvement according to claim 1, wherein said contoured body comprises raised features for mounting controls.

21. The improvement according to claim 1, wherein said contoured body comprises a recessed rail arranged for providing a chase for electrical wires.

22. The improvement according to claim 1, wherein said integral floor and fender structure comprises a recessed rail arranged for providing a chase for mechanical cables.

23. In a utility vehicle having a chassis supported on wheels, and an operator's cab framed by a cab frame, the improvement comprising:

an integral floor and fender structure formed by a contoured body substantially composed of plastic material, said contoured body configured to be supported on said chassis, said contoured body having longitudinally extending recesses, concave facing upwardly, said recesses having open tops and closed sides and bottoms; and said cab frame having spaced-apart, longitudinally extending bottom side members, each having a substantially rectangular cross section sized for each member to be at least partially fit within and secured within a respective one of said recesses, said cab frame extending upward from said top side of said contoured body.

24. The improvement according to claim 23, wherein said contoured body includes right and left fenders and a seat supporting platform integrally formed between said right and left fenders, a foot supporting area, and formed rail portions extending along said fenders and into said foot supporting area.

25. The improvement according to claim 24, wherein said contoured body comprises a fiberglass center layer covered on opposite surfaces by RIM material, wherein said RIM material comprises a composite plastic material.

26. The improvement according to claim 23, wherein said contoured body comprises a substantially homogeneous fiber-reinforced plastic.

27. The improvement according to claim 23, wherein said contoured body comprises side rails for forming window and door sealing surfaces.

28. In a utility vehicle having a chassis supported on wheels, and an operator's cab framed by a cab frame, the improvement comprising:

an integral floor and fender structure formed by a contoured body substantially composed of plastic material, said contoured body having longitudinally extending recesses open on a top side of said contoured body, each said recess having an open top, a bottom and opposite sidewalls;

said cab frame having spaced-apart, longitudinally extending bottom side members each at least partially secured within a respective one of said recesses; and wherein said operator's cab comprises a roof and said cab frame comprises a pair of front columns and a pair of rear columns supporting said roof, and said bottom side members connect said front columns to said rear columns.

29. The improvement according to claim 23, wherein said utility vehicle comprises a tractor.

30. The improvement according to claim 23, wherein said contoured body comprises raised surfaces for mounting controls.

31. The improvement according to claim 23, wherein said contoured body structure comprises a recessed rail arranged for providing a chase for electrical wires and mechanical cables.

32. The improvement according to claim 23, wherein said bottom side members are each at least partially secured within said respective one of said recesses by adhesive.

33. The improvement according to claim 1, wherein said side members are curved from said rear of said cab frame to said front of said cab frame.

34. The improvement according to claim 33, wherein said side members are located a preselected distance inward of opposite lateral edges of said contoured body, and said contoured body comprises a side rail along at least one of said lateral edges to form a door sealing surface.

35. The improvement according to claim 34, wherein said contoured body is a unitary part.

36. The improvement according to claim 35, wherein said cab frame comprises lateral members that connect said side members at said front and rear of said cab frame.

37. The improvement according to claim 36, wherein said contoured body includes:

right and left fenders and a seat supporting platform integrally formed between said right and left fenders;

a foot supporting area and formed rail portions extending along said fenders and into said foot supporting area;

reinforced portions for interface with isolation mounts; and a foot supporting area, seat and seatback supporting areas, fender covering area, and a rear wall.

38. The improvement according to claim 1, wherein said contoured body is mounted to said chassis at mounting locations, and wherein said metal cab frame is fixed to said contoured body at fixing locations that do not coincide with said mounting locations.

39. The improvement according to claim 38, wherein said chassis comprises isolation mounts, and wherein said contoured body includes reinforced portions at said mounting locations for interface with said isolation mounts.

* * * * *